July 28, 1936.  D. L. MILLER  2,049,218

BICYCLE STAND

Filed Aug. 12, 1935

Inventor
Donald L. Miller
By M. Talbert Week
Attorney

Patented July 28, 1936

2,049,218

UNITED STATES PATENT OFFICE 2,049,218

BICYCLE STAND

Donald L. Miller, Des Moines, Iowa

Application August 12, 1935, Serial No. 35,760

7 Claims. (Cl. 208—75)

The principal object of my invention is to provide an attachable stand device for holding bicycles or like in a substantially upright position when not in use that is economical in manufacture, light in weight, strong in construction, and durable.

A further object of this invention is to provide a bicycle stand that may be easily and quickly attached to or detached from a bicycle without special tools or the service of a skilled mechanic.

A still further object of my invention is to provide an easily operated bicycle stand that may easily and accurately be adjusted relative to the amount of tension for yieldingly holding it in operative or inoperative positions.

These and other objects will be apparent to those skilled in the art.

My invention consists in the construction, arrangement and combination of the various parts of the device, whereby the objects contemplated are attained as hereinafter more fully set forth, pointed out in my claims, and illustrated in the accompanying drawing, in which:

Figure 1:
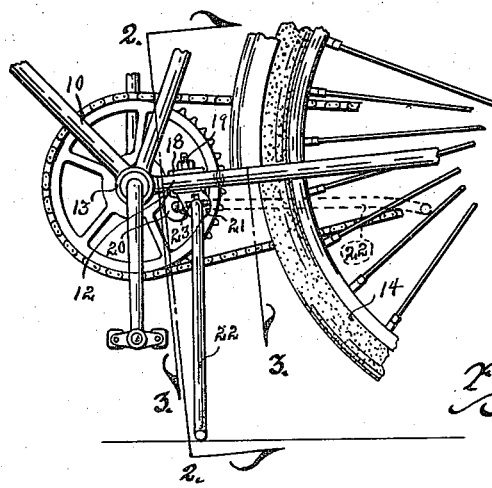
Fig. 1 is a side view of the central portion of a bicycle with my device installed and supporting the bicycle.

The use of bicycles in cities necessitates a rapid functioning supporting stand for holding the bicycle in a near upright position when not in use. Supporting stands of the "kick" type are universally used for this purpose, but they are obviously objectionable from a standpoint of bulk, weight, and cost. I have overcome such objections by providing a strong, light, economical stand of the "kick" type and which I will now describe.

Referring to the drawing, I have used the numeral 10 to designate an ordinary bicycle having the usual two spaced apart frame bars 11 and 12 extending substantially horizontal from the hangar bearing housing 13 to the axle of the rear bicycle wheel 14. It is to these two frame bars 11 and 12 and closely adjacent the bearing housing 13 that supports the crank pedal assembly that I detachably secure my "kick" stand.

Figure 3:
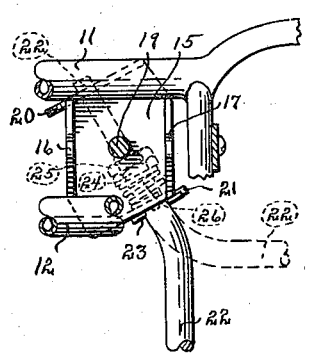
Fig. 3 is a top plan-sectional view of the fixed end portion of my stand and the central frame portion of the bicycle to which it is attached and is taken on line 3—3 of Fig. 1.

The numeral 15 designates the flat central base portion of the bearing portion of the stand. The numerals 16 and 17 designate two upwardly bent and extending projections formed on each end of the base 15, as shown in Fig. 3.

These two spaced apart flange projections are tapered as they extend upwardly and are so proportioned and designed as to extend upwardly between the frame bars 11 and 12 and to engage them by wedging action by being positioned transversely of the frame bars. The height and tapering widths of these parallel projections 16 and 17 should be such that their extreme top marginal edges do not extend above the horizontal top plane of the frame bars 11 and 12 and the base portion 15 is held below engagement with the bottom surfaces of the bars 11 and 12. The numeral 18 designates a bar plate designed to rest across and over the top surfaces of the frame bars 11 and 12. This bar plate may be straight, as shown, or irregular. The numeral 19 designates a bolt extending through the center portion of the base portion 15 and the bar plate 18. Obviously, by tightening the bolt 19 the tapered projections 16 and 17 will be drawn upwardly to rigidly wedge engage the bars 11 and 12 and the plate 18 will be drawn downwardly to rigidly engage the tops of the bars 11 and 12.

Figure 5:
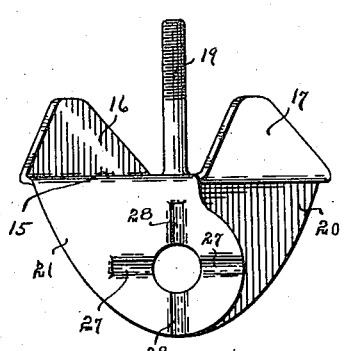
Fig. 5 is an enlarged side view of the bearing portion of my device and more fully illustrates its construction.
Figure 6:
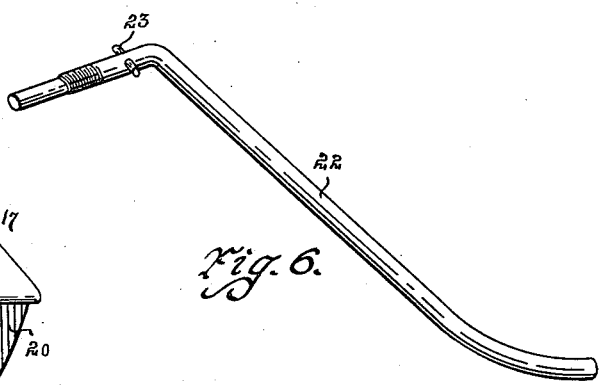
Fig. 6 is an enlarged perspective view of the arm portion of the stand.

The numerals 20 and 21 designate two bearing ears bent downwardly from the two sides of the base portion 15, respectively. These two spaced apart bearing ears extend substantially vertically downwardly from the base portion 15 and have their parallel widths extending at an angle to, but not at a right angle to, the projections 16 and 17, as shown in Fig. 5. This angle of the bearing ears to the projections 11 and 12 and to the longitudinal axis of the bicycle is such that if a transverse line were drawn through the bearing ears, this line would extend rearwardly and to the left side of the bicycle, as shown in Fig. 3. This angle of the bearing ears is highly important and is accomplished by placing the bearing ears 20 and 21 in parallel relationship with the bearing ear 20 resting in a plane in advance of the plane of the bearing ear 21.

Figure 2:
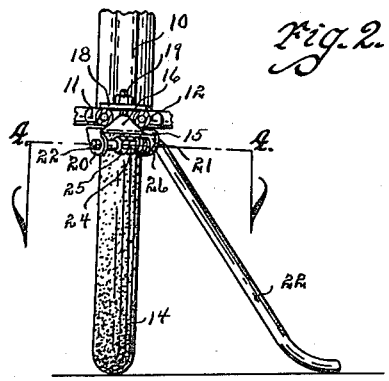
Fig. 2 is a front end view of my stand supporting a bicycle and is taken on line 2—2 of Fig. 1.
Figure 4:
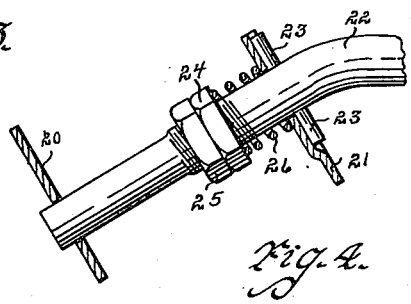
Fig. 4 is an enlarged top plan-sectional view of the fixed end portion of my stand and is taken on line 4—4 of Fig. 2.

The numeral 22 generally designates the supporting arm or leg portion of the device. This arm 22 has its upper fixed end resting in substantially a horizontal plane and journaled in and through the two downwardly extending bearing ears 20 and 21, as shown in Fig. 4. This upper fixed end portion of the arm 22 is straight and as it extends transversely of the bearing ears 20 and 21, this upper fixed end portion that is rotatably mounted in the bearing ears will extend rearwardly and to the left side of the bicycle, as shown in Fig. 3. By this construction the upper rotatably fixed portion of the arm 22 will operate at all times in a substantially horizontal plane, but at an angle to the longitudinal axis of the bicycle. When the supporting arm 22 is in operative position, as shown in Fig. 1, it is bent first downwardly and outwardly from a point just outside the bearing ear 21 and then near its outer free end it is curved slightly to assume a substantial curved horizontal position, as shown in Fig. 2, for engagement with a supporting surface. The numeral 23 designates a pin element extending transversely through the arm support 22 at a point just above the point where the arm is first bent outwardly and downwardly. This pin element 23 is adjacent the outer face of the bearing ear 21 and limits the sliding movement of the upper fixed portion of the arm sliding inwardly and forwardly in the bearing ears 20 and 21. The numeral 24 designates a tension adjusting nut threaded on the arm 22 and positioned between the bearing ears 20 and 21, as shown in Fig. 4. This nut 24 may be secured against accidental rotation by the lock nut 25, which is also threaded on the arm 22 and which is adjacent the nut 24.

The numeral 26 designates a compression spring embracing the arm 22 and so positioned that one of its ends engages the inner side of the bearing ear 21 and its other end engages the nut 24, as shown in Fig. 3 and Fig. 4. By the above described arrangement of parts, the arm 22 will be both rotatably and slidably mounted in the bearing ears 20 and 21, but the coil spring 26 will yieldingly hold the supporting arm 22 against reciprocation in the bearing ears and the pin 23 in direct frictional contact with the outside face of the bearing ear 21. The numeral 27 designates a trough depression formed in the outer face of the bearing ear 21 and crossing the point where the supporting arm 22 bearings in the ear 21, as shown in Fig. 5. This trough depression extends substantially horizontal and is designed to receive the two ends portions of the pin 23, respectively. The numeral 28 designates a second trough depression formed in the outer face of the ear 21 and crossing the point where the support arm 22 bearings in the ear 21. This trough depression 28 is similar to the trough depression 27 in that it is designed to also receive the two end portions of the pin 23 at times, but it is substantially vertically arranged instead of horizontally arranged as shown in Fig. 5.

When the support arm 22 is in a lowered operative position such as shown in Figs. 1 and 2, the pin 23 will be pulled into engagement and yieldingly rest in the trough depression 27 by virtue of the action of the spring 26 and when the support arm 22 is moved to an inoperative upward position as shown by dotted lines in Fig. 1, the pin 23 will engage and yieldingly rest in the trough depression 28 for the same reasons.

By the coil spring always yieldingly tending to move the rotatable end portion of the arm 22 inwardly and forwardly it will always yieldingly hold the pin 23 in engagement with either the trough depression 27 or the trough depression 28. The result will be that the arm 22 will always be yieldingly held in either an operative position or an inoperative position and it will require manual force to move the arm support out of either of the positions. The employment of this necessary force to change the location or position of the arm 22 usually consists in kicking the arm 22 with the foot of the operator. If the supporting arm 22 is in an upward inoperative position the foot is placed on its outer free end portion and force is then exerted to move it into a lowered operative position. To place the supporting arm 22 in an inoperative position it is merely necessary to kick the arm 22 upwardly and into an inoperative position. Either direction of movement of the arm 22 must be against the action of the coil spring 26 normally yieldingly holding the pin 23 in one of the trough depressions. When the arm 22 is actually moved in either direction its upper end will not only rotate in the bearing ears 20 and 21, but will slide rearwardly and to the left against the action of the spring 26 to permit the pin 23 to move out of engagement with the circular trough depression in which it was just previously resting.

Due to the previously explained positions and arrangement of the bearing ears 20 and 21, the position and construction of that portion of the arm 22 bearing in the ears, and that portion of the arm 22 which is bent downwardly and outwardly, the arm 22 will when in operative position, extend downwardly and outwardly at the side of the bicycle, as shown in Fig. 2, to support it, but when it is rotatably moved to an inoperative position it will rest substantially parallel and closely adjacent to the wheel 14, as shown in Fig. 1 and Fig. 3.

Obviously, when the supporting arm 22 is swung to rest adjacent the side of the wheel 14 it will be out of the way and the bicycle can be used without any interference whatsoever from it.

To attach my bicycle support to a bicycle it is merely necessary to loosen the single bolt 19. It is attached as easily as it is removed, as the members 16 and 17 will automatically center themselves between the frame bars 11 and 12 and all that is necessary is to tighten the bolt 19, forcing the member 18 downwardly on the frame bars 11 and 12 and bringing the portions 16 and 17 into wedged engagement with and between these frame bars. Obviously, such an arrangement provides a strong, rigid, but light construction.

Obviously, the resistance offered to move the supporting arm 22 from either its operative or inoperative position will depend upon the tension of the spring 26. This tension is adjustably had by adjusting the nut 24 on the rod 22.

Some changes may be made in the construction and arrangement of my improved bicycle stand without departing from the real spirit and purpose of my invention, and it is my intention to cover by my claims any modified forms of structure or use of mechanical equivalents which may be reasonably included within their scope.

I claim:

1. In a device of the class described, a horizontal base portion, parallel vertical ears extending from said base portion at an angle to both the longitudinal and transverse axis of said base portion, and a rod having one of its end portions horizontally bearing in said ears and its other end portion bent outwardly at an angle to its bearing portion.

2. In a device of the class described, a horizontal base portion, parallel vertical ears extending from said base portion at an angle to both the longitudinal and transverse axis of said base portion, a rod having one of its end portions horizontally bearing in said ears and its other end portion bent outwardly at an angle to its bearing portion, and a coil spring having one of its ends operatively engaging said rod and its other end operatively engaging one of said ears.

3. In a device of the class described, a horizontal base portion, parallel vertical ears extending from said base portion at an angle to both the longitudinal and transverse axis of said base portion, a rod having one of its end portions horizontally bearing in said ears and its other end portion bent outwardly at an angle to its bearing portion, a coil spring having one of its ends operatively engaging said rod and its other end operatively engaging one of said ears, stop depressions in one of said ears, and a pin on said rod capable of selectively entering said stop depressions.

4. In a device of the class described, a horizontal base portion, parallel vertical ears extending from said base portion at an angle to both the longitudinal and transverse axis of said base portion, a rod having one of its end portions horizontally bearing in said ears and its other end portion bent outwardly at an angle to its bearing portion, a yielding means for yieldingly holding said rod against rotation at times, and a means for adjusting the yeilding action of said yielding means.

5. In a bicycle support, a flat base member, two spaced apart downwardly extending bearing ears integrally formed on said base, two spaced apart upwardly extending wedge tapered ears integrally formed on said base, a plate member, a bolt extending through said base and said plate member, and a movable supporting member operatively secured to said two bearing ears.

6. In a bicycle support, a flat base member, two spaced apart downwardly extending bearing ears integrally formed on said base, two spaced apart upwardly extending wedge tapered ears integrally formed on said base, a plate member, a bolt extending through said base and said plate member, a bent rod journaled through said two bearing ears, depressions in one of said ears, a member on said rod capable of entering and engaging each of said depressions, and a coil spring embracing said rod between said bearing ears operatively engaging one of said ears and said rod.

7. In combination with a bicycle having two spaced apart frame bars, a bicycle support, comprising a base portion, a wedge portion on said base portion designed to extend between and in engagement with said two spaced apart frame bars, a means for drawing said wedge portion into rigid engagement with and between said two spaced apart frame bars, parallel vertical ears extending downward from said base portion at an angle to both the longitudinal and transverse axis of said base portion, and a rod having one of its end portions horizontally bearing in said ears and its other end portion bent outwardly at an angle to its bearing portion.

DONALD L. MILLER.